United States Patent
Knapp et al.

(10) Patent No.: US 12,511,566 B2
(45) Date of Patent: Dec. 30, 2025

(54) QUANTUM DEVICES WITH CHAINS OF QUANTUM DOTS FOR CONTROLLING TUNABLE COUPLINGS BETWEEN MAJORANA ZERO MODES

(71) Applicant: Microsoft Technology Licensing, LLC, Redmond, WA (US)

(72) Inventors: Christina Paulsen Knapp, Goleta, CA (US); Roman Bela Bauer, Santa Barbara, CA (US); Torsten Karzig, Redwood City, CA (US); Roman Mykolayovych Lutchyn, Santa Barbara, CA (US); Jonne Verneri Koski, The Hague (NL); David Reilly, Sydney (AU)

(73) Assignee: Microsoft Technology Licensing, LLC, Redmond, WA (US)

( * ) Notice: Subject to any disclaimer, the term of this patent is extended or adjusted under 35 U.S.C. 154(b) by 760 days.

(21) Appl. No.: 17/870,920

(22) Filed: Jul. 22, 2022

(65) Prior Publication Data
US 2024/0028940 A1    Jan. 25, 2024

(51) Int. Cl.
*G06N 10/40* (2022.01)
*H10N 60/20* (2023.01)

(52) U.S. Cl.
CPC .................. *G06N 10/40* (2022.01)

(58) Field of Classification Search
CPC ............... G06N 10/40; H10N 60/205
See application file for complete search history.

(56) References Cited

U.S. PATENT DOCUMENTS

| | | | |
|---|---|---|---|
| 2018/0053113 A1* | 2/2018 | Lutchyn | H10N 69/00 |
| 2019/0013457 A1 | 1/2019 | Lutchyn et al. | |
| 2021/0005661 A1 | 1/2021 | Freedman et al. | |
| 2021/0011771 A1* | 1/2021 | Bonderson | G06N 10/70 |
| 2021/0336119 A1 | 10/2021 | Lutchyn et al. | |

(Continued)

FOREIGN PATENT DOCUMENTS

| | | | |
|---|---|---|---|
| WO | WO-2021204897 A1 * | 10/2021 | G06N 10/00 |
| WO | 2023284936 A1 | 1/2023 | |

OTHER PUBLICATIONS

Knapp, Christina, Topological Quantum Computing with Majorana Zeros and Beyond, 2019, University of California, Santa Barbara, pp. 1-399 (Year: 2019).*

(Continued)

*Primary Examiner* — Nghia M Doan
(74) *Attorney, Agent, or Firm* — Ranjeev Singh; Singh Law, PLLC

(57) ABSTRACT

Quantum devices with chains of quantum dots for controlling tunable couplings between Majorana zero modes (MZMs) are described. Methods for controlling tunable couplings between MZMs using such chains of quantum dots are also described. An example quantum device comprises at least one superconducting island configurable to support at least one pair of Majorana zero modes (MZMs). The quantum device may further include a region adjacent to at least one MZM of the at least one pair of MZMs, where the region is configurable to realize a chain of quantum dots for controlling a tunable coupling between the at least one MZM of the at least one pair of MZMs and another MZM.

20 Claims, 10 Drawing Sheets

(56) References Cited

U.S. PATENT DOCUMENTS

2022/0036227 A1* 2/2022 Karzig .................. G06N 10/00

OTHER PUBLICATIONS

U.S. Appl. No. 17/870,969, filed Jul. 22, 2022.
U.S. Appl. No. 17/871,045, filed Jul. 22, 2022.
Cao, et al., "Recent Progress on Majorana in Semiconductor-Superconductor Heterostructures-Engineering and Detection", In Repository of arXiv:2206.06916v1, Jun. 14, 2022, 19 Pages.
"International Search Report and Written Opinion Issued in PCT Application No. PCT/US2023/022011", Mailed Date: Jul. 27, 2023, 12 Pages.
Aghaee, et al., "InAs—Al Hybrid Devices Passing the Topological Gap Protocol", In Repository of arXiv:2207.02472v1, Jul. 6, 2022, pp. 1-34.
Deng, et al., "Nonlocality of Majorana Modes in Hybrid Nanowires", In Journal of Physics Review B, vol. 98, Issue 8, Aug. 13, 2018, pp. 1-10.
"International Search Report and Written Opinion Issued in PCT Application No. PCT/US2023/022010", Mailed Date: Aug. 31, 2023, 17 Pages.
"International Search Report and Written Opinion issued in PCT Application No. PCT/US2023/022016", Mailed Date: Sep. 20, 2023, 19 Pages.
Prada, et al., "Measuring Majorana Nonlocality and Spin Structure with a Quantum Dot", In Journal of Physical Review B, vol. 96, Issue 8, Aug. 11, 2017, pp. 1-10.
Sherman, et al., "Normal, Superconducting and Topological Regimes of Hybrid Double Quantum Dots", In Journal of Nature Nanotechnology, Nov. 14, 2016, pp. 212-217.
Zhou, et al., "Fusion of Majorana bound states with mini-gate control in two-dimensional systems", In Journal Nature Communications, vol. 13, Issue 1, Apr. 1, 2022, pp. 1-10.
Fidkowski, et al., "Majorana Zero Modes in 1D Quantum Wires Without Long-Ranged Superconducting Order", In Repository of arXiv:1106.2598v3, Jul. 6, 2011, 14 Pages.
Haim, et al., "Signatures of Majorana Zero Modes in Spin-Resolved Current Correlations", In Repository of arXiv:1411.0673v2, Apr. 28, 2015, 8 Pages.
Karzig, et al., "Scalable Designs for Quasiparticle-Poisoning-Protected Topological Quantum Computation with Majorana Zero Modes", In Repository of arXiv:1610.05289v4, Jun. 21, 2017, 34 Pages.
Knapp, et al., "Dephasing of Majorana-based Qubits", In Repository of arXiv:1711.03968v3, May 22, 2018, 15 Pages.
Petersson, et al., "Charge and Spin State Readout of a Double Quantum Dot Coupled to a Resonator", In Repository of arXiv:1004.4047v1, Apr. 23, 2010, 5 Pages.
Pikulin, et al., "Protocol to Identify a Topological Superconducting Phase in a Three-Terminal Device", In Repository of arXiv:2103.12217v1, Mar. 22, 2021, 28 Pages.
Plugge, et al., "Majorana Box Qubits", In Repository of arXiv:1609.01697v2, Dec. 21, 2016, 11 Pages.
Thakurathi, et al., "Transport Signatures of Topological Phases in Double Nanowires Probed by Spin-Polarized STM", In Repository of arXiv:2001.05470v1, Jan. 15, 2020, 12 Pages.
Tran, et al., "Optimizing Clifford Gate Generation for Measurement-Only Topological Quantum Computation with Majorana Zero Modes", In Repository of arXiv:1909.03002v4, Mar. 27, 2020, 72 Pages.
Zhang, et al., "Next Steps of Quantum Transport in Majorana Nanowire Devices", In Journal of Nature Communications, vol. 10, Article No. 5128, Nov. 12, 2019, 7 Pages.

* cited by examiner

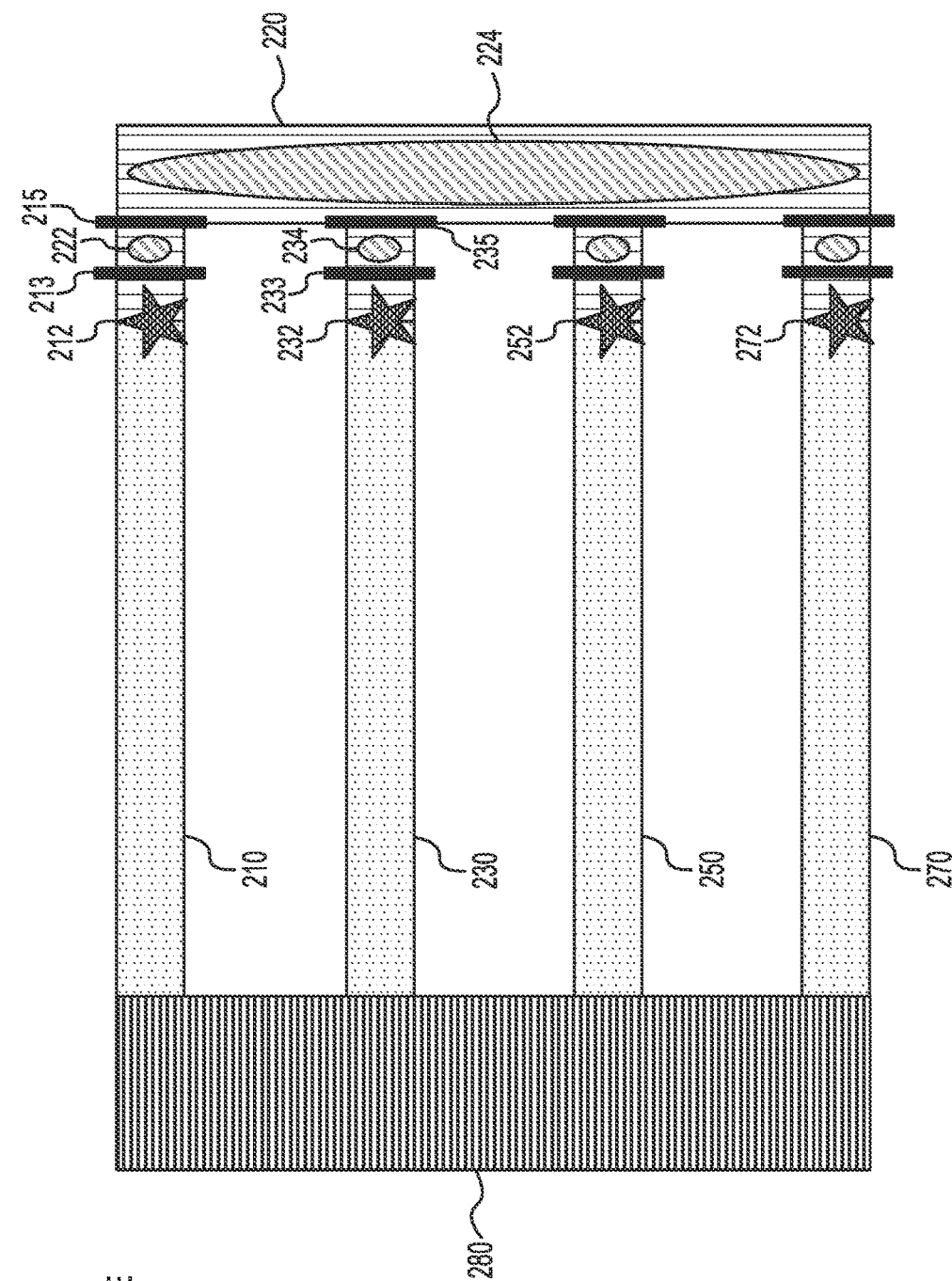
FIG. 2
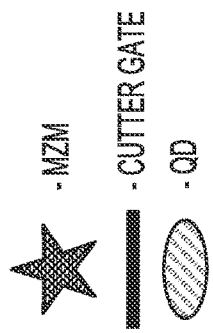

ic dots in the chain. As used herein, the term "quantum dot" includes any nanoscale island containing a small number of electrons that is characterized by a capacitance. Such quantum dots can be created in several ways, including via the design of layers for creating the dots and by the application of gates.

QUANTUM DEVICES WITH CHAINS OF QUANTUM DOTS FOR CONTROLLING TUNABLE COUPLINGS BETWEEN MAJORANA ZERO MODES

BACKGROUND

Measurement-based Majorana zero mode (MZM) qubits require coupling of pairs of MZMs through adjacent semiconductors or superconductors. To allow different MZM pairs to be coupled, different coupling paths require turning on or off. Conventionally, such coupling paths have been controlled by cutter gates that apply a voltage pulse to change the junction between MZMs from a tunneling configuration to a fully pinched-off configuration.

Cutter gates generally cover a small area and thus have a small lever arm to the semiconducting region underneath. As a result, the voltage pulses applied to the cutter gates can require large amplitudes. Applying fast voltage swings having large amplitudes complicates control of the qubit and leads to an increase in the qubit temperature, resulting in a larger qubit error probability. The latter is because error processes in MZM qubits are exponentially suppressed in the energy scales of the topological gap $\Delta$ and charging energy $E_C$ over the temperature T.

Accordingly, there is a need for improvements to controlling tunable couplings between Majorana zero modes (MZMs).

SUMMARY

In one example, the present disclosure relates to a quantum device comprising at least one superconducting island configurable to support at least one pair of Majorana zero modes (MZMs). The quantum device may further include a region adjacent to at least one MZM of the at least one pair of MZMs, where the region is configurable to realize a chain of quantum dots for controlling a tunable coupling between the at least one MZM of the at least one pair of MZMs and another MZM.

In another example, the present disclosure relates to a quantum device comprising at least one superconducting island configurable to support at least one pair of Majorana zero modes (MZMs). The quantum device may further include a region adjacent to at least one MZM of the at least one pair of MZMs, where the region is configurable to realize a chain of quantum dots for controlling a tunable coupling between the at least one MZM of the at least one pair of MZMs and another MZM, where the tunable coupling between the at least one MZM of the at least one pair of MZMs and another MZM can be controlled by pulsing a plunger gate associated with one of the chain of quantum dots without changing a fixed voltage supplied to any cutter gates associated with the quantum device. As described later, the tunable coupling between the at least one MZM of the at least one pair of MZMs and another MZM can also be controlled by using other ways to tune a quantum dot in the chain of quantum dots on resonance or off resonance.

In yet another example, the present disclosure relates to a method for operating a quantum device comprising at least one superconducting island configurable to support at least one pair of Majorana zero modes (MZMs). The method may include configuring a region adjacent to at least one MZM of the at least one pair of MZMs to realize a chain of quantum dots for controlling a tunable coupling between the at least one MZM of the at least one pair of MZMs and another MZM.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 2 is a block diagram of a quantum device with chains of quantum dots and cutter gates in accordance with one example;

DETAILED DESCRIPTION

Figure 1:
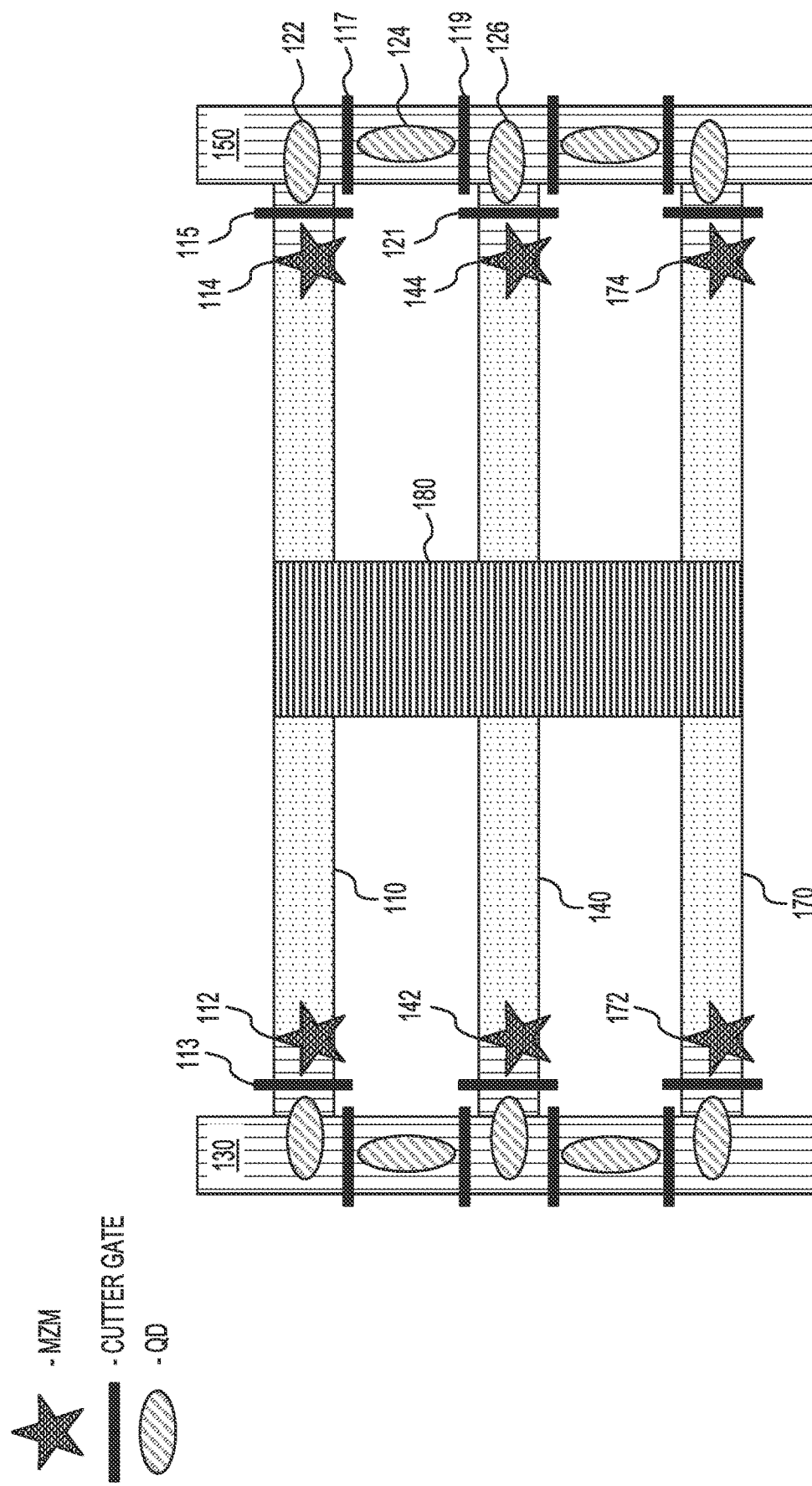
FIG. 1 is a block diagram of a quantum device with chains of quantum dots and cutter gates in accordance with one example.

Examples described in this disclosure relate to quantum devices with chains of quantum dots for controlling tunable couplings between Majorana zero modes (MZMs). Methods for controlling tunable couplings between Majorana zero modes (MZMs) using such chains of quantum dots are also described. MZM qubits require rapidly configuring couplings between different pairs of MZMs for qubit operations and measurement. As used herein, the term qubit refers to any quantum system that can be in a superposition of two quantum states, 0 and 1. Conventionally, such coupling paths have been controlled by cutter gates that apply a voltage pulse to change the junction between MZMs from a tunneling configuration to a fully pinched-off configuration. Cutter gates may generally cover a small area, and may thus have small lever arms to the semiconducting region underneath. As a result, these voltage pulses can require large amplitudes. Applying fast voltage swings having large amplitudes complicates control of the qubit and leads to an increase in the qubit temperature, resulting in a larger qubit error probability. The latter is because as noted earlier, error processes in MZM qubits are exponentially suppressed in the energy scales of the topological gap $\Delta$ and charging energy $E_C$ over the temperature T. This effect can be partially remedied by reducing the required amplitude of these fast pulses.

To address these issues, the present disclosure proposes using chains of quantum dots so that the couplings between MZMs can be controlled by the detuning of the quantum dots from their resonance point with the qubit island. The detuning of the quantum dot can be controlled by changing the voltage applied to QD plunger gates without changing any voltages associated with the cutter gates. As used herein, the term "plunger gate" refers to a gate that has a large overlap with the full extent of the quantum dot. Alternatively, the quantum dot detuning could be controlled by applying a small voltage pulse to one of the cutter gates that has a lever arm to an adjacent quantum dot. As tuning the quantum dot on resonance or off resonance only requires changing the electron number by one, the amplitude of these voltage pulses can have orders of magnitude smaller voltage swings than those required to open and pinch off a cutter gate. The reduction in the amplitude of the voltage pulses may reduce the need for compensating pulses on nearby gates and result in a significant reduction in how much the qubit heats up when operated. Consistent with examples in the present disclosure, the coupling between quantum dots and MZMs is at least in part controlled by quantum dot plungers, which tune the quantum dot to or away from the Coulomb valley. Since the quantum dot plungers can have orders of magnitude smaller voltage swings than the voltage pulses applied to cutter gates, this results in a significant reduction in how much the qubit heats up when operated. In addition, the use of chains of quantum dots (QDs) for operating Majorana-based qubits can reduce complicated junctions in the qubits to simple QD-QD junctions. Quantum dots that are used to control the tunable connections between pairs of MZMs may be viewed as performing the function of a cutter gate, and thus may be referred to as cutter dots. The charging energy associated with cutter dots may further improve the quality of the junctions as level repulsion can remove unwanted bound states that complicate junction tunability.

In the examples described herein, the junctions are formed by having a quantum dot that can couple to MZMs or adjacent quantum dots through cutter gates set to fixed or nearly-fixed voltages, then tuning these cutter dots (e.g., quantum dots functioning as cutter gates) to resonance (e.g., a configuration where there is negligible energetic penalty for an additional electron to tunnel from an adjacent dot or topological wire into the quantum dot in question) increases the probability of single-electron transport through that junction. Tuning these cutter dots off resonance (e.g., a regime where tunneling an electron onto the dot incurs significant energy penalty, also referred to as the dot being in a Coulomb valley) decreases the probability of single-electron transport through the junction. When the charging energy of the cutter dot is sufficiently large, the difference in tunneling through the junction when the dot is resonant or in a Coulomb valley can be sufficient for operating the MZM qubit. Since QD-plunger gates generally have larger lever arms and resonance and off-resonance here corresponds to changing the occupation of the dot by a single electron, the voltage pulse needed for this type of operation will generally be orders of magnitude smaller than that needed to open and close cutter gates. The tunable couplings between an MZM and another MZM can be controlled by pulsing a plunger gate associated with a quantum dot without changing a fixed voltage supplied to any cutter gates adjacent to the MZMs. As an alternative, the tunable couplings between the MZM and another MZM can also be controlled: (1) by detuning a quantum dot by applying a voltage pulse to an adjacent cutter gate, or (2) by detuning the quantum dot by applying a voltage pulse to any combination of adjacent plunger gates and cutter gates. As another alternative, the tunable coupling between the MZM and another MZM can also be controlled by pulsing a cutter gate associated with a chain of quantum dots to change the detuning of at least one of the chain of quantum dots.

There are additional benefits of using cutter dots for operating Majorana-based qubits. When the dots can be connected to transport leads, the qubit can be tuned into the topological phase using spin-filtering techniques or particle/hole-filtering techniques. Moreover, scalable qubit arrays require networks of semiconducting wires that need to be configured to different measurement loops. Using cutter dots simplifies such networks because junctions can be governed by simpler QD-QD junctions. Plunger gates associated with the cutter dots may be pulsed using one or more voltage waveforms. The voltage waveform(s) may be generated using a control system, including an oscillator, switches, finite state machines, and a memory. As an example, the memory may be implemented as one or more multi-bit registers for allowing pulse-patterns to be stored.

FIG. 1 is a block diagram of a quantum device 100 with chains of quantum dots and cutter gates in accordance with one example. Quantum device 100 may include topological superconductors (e.g., 110, 140, and 170) that are coupled via a trivial superconductor 180 (e.g., a qubit backbone). The combination of the topological superconductors and the backbone may be referred to as a superconducting island. Each of superconductors 110, 140, 170, and 180 may be formed as nanowires. As an example, superconductors 110, 140, 170, and 180 may be formed as semiconductor wires (e.g., indium arsenide (InAs) wires) coated by a superconductor (e.g., aluminum (Al)). Ends of topological superconductors 110, 140, and 170 may further be coupled via semiconducting regions 130 and 150. In one example, the terms topological and trivial refer to the phase of the superconductor and even a single superconducting nanowire can have sections that are tuned using electrostatic gates to form topological or trivial superconducting sections.

With continued reference to FIG. 1, quantum device 100 is operated such that Majorana zero modes (MZMs) 112 and 114 are formed at the ends of topological superconductor 110, MZMs 142 and 144 are formed at the ends of topological superconductor 140, and MZMs 172 and 174 are formed at the ends of topological superconductor 170. Cutter gates and quantum dots formed in semiconducting regions (e.g., semiconducting regions 130 and 150) adjoining the MZMs may allow for the tunable coupling of MZMs to each other or to transport leads. As an example, a transport lead (not shown) could be formed adjacent to the top portion of semiconducting region 150. A tunable coupling could be formed between the transport lead formed adjacent to the top portion of semiconducting region 150 and MZM 114. As an example, quantum device 100 may include cutter gates (e.g., cutter gates 113, 115, 117, 119, and 121) arranged as shown in FIG. 1. Cutter gates (e.g., cutter gates 113, 115, 117, 119, and 121) may be supplied a fixed voltage that is sufficiently large to create a small but finite probability of electrons being able to tunnel through a region controlled by a respective cutter gate.

Still referring to FIG. 1, a tunable coupling between MZM 114 and MZM 144 may be controlled through a chain of quantum dots, including quantum dot (QD) 122, QD 124, and QD 126. The quantum dots that are adjacent to the MZMs may have a designated plunger gate that can be used to tune the quantum dot on-resonance or off-resonance with respect to the qubit island. Quantum device 100 may be operated in a manner such that all MZM connections can be configured solely by pulsing the QD plunger gates while leaving all cutter gates at a fixed voltage. Alternatively, as noted earlier, the quantum dot detuning could be controlled by applying a small voltage pulse to one of the cutter gates that has a lever arm to an adjacent quantum dot. As an example, by applying a small voltage pulse to one or both of cutter gates 117 and 119, the detuning of quantum dots 122, 124, and 126 may be controlled. Advantageously, the use of chains of quantum dots to control the couplings between MZMs (e.g., MZM 114 and MZM 144) by the detuning of the quantum dots (e.g., QD 122, QD 124, and QD 126) from their resonance point with the qubit island without changing any voltages associated with the cutter gates, reduces the heating compared to that from applying large amplitude voltage pulses to open and pinch-off cutter gates. Although FIG. 1 shows quantum device 100 as including a certain number of components arranged and coupled in a certain way, quantum device 100 may include fewer or additional components arranged and coupled differently.

FIG. 2 is a block diagram of a Majorana zero mode (MZM) device 200 with chains of quantum dots and cutter gates in accordance with one example. Quantum device 200 may include topological superconductors (e.g., 210, 230, 250, and 270) that are coupled via a trivial superconductor 280 (e.g., a qubit backbone). The combination of the topological superconductors and the backbone may be referred to as a superconducting island. Each of superconductors 210, 230, 250, 270, and 280 may be formed as nanowires. As an example, superconductors 210, 230, 250, 270, and 280 may be formed as semiconductor wires (e.g., indium arsenide (InAs) wires) coated by a superconductor (e.g., aluminum (Al)). Ends of topological superconductors 210, 230, 250, and 270 may further be coupled via a semiconducting region 220.

With continued reference to FIG. 2, quantum device 200 is operated such that Majorana zero mode (MZM) 212 is formed at one end of topological superconductor 210, MZM 232 is formed at one end of topological superconductor 230, MZM 252 is formed at one end of topological superconductor 250, and MZM 272 is formed at one end of topological superconductor 270. Cutter gates and quantum dots formed in semiconducting region 220 adjoining the MZMs may allow for the tunable coupling of MZMs to each other or to transport leads. As an example, quantum device 200 may include cutter gates (e.g., cutter gates 213, 215, 233, and 235) arranged as shown in FIG. 2. Cutter gates (e.g., cutter gates 213, 215, 233, and 235) may be supplied a fixed voltage that is sufficiently large to create a small but finite probability of electrons being able to tunnel through a region controlled by a respective cutter gate.

Still referring to FIG. 2, a tunable coupling between MZM 212 and MZM 232 may be controlled through a chain of quantum dots, including quantum dot (QD) 222, QD 224, and QD 234. The quantum dots that are adjacent to the MZMs may have a designated plunger gate that can be used to tune the quantum dot on-resonance or off-resonance with respect to the qubit island. Quantum device 200 may be operated in a manner such that all MZM connections can be configured solely by pulsing the QD plunger gates while leaving all cutter gates at a fixed voltage. Advantageously, the use of chains of quantum dots to control the couplings between MZMs (e.g., MZM 212 and MZM 232) by the detuning of the quantum dots (e.g., QD 222, QD 224, and QD 234) from their resonance point with the qubit island without changing any voltages associated with the cutter gates, reduces the heating compared to that from applying large amplitude voltage pulses to open and pinch-off cutter gates. Although FIG. 2 shows quantum device 200 as including a certain number of components arranged and coupled in a certain way, quantum device 200 may include fewer or additional components arranged and coupled differently.

Figure 3:
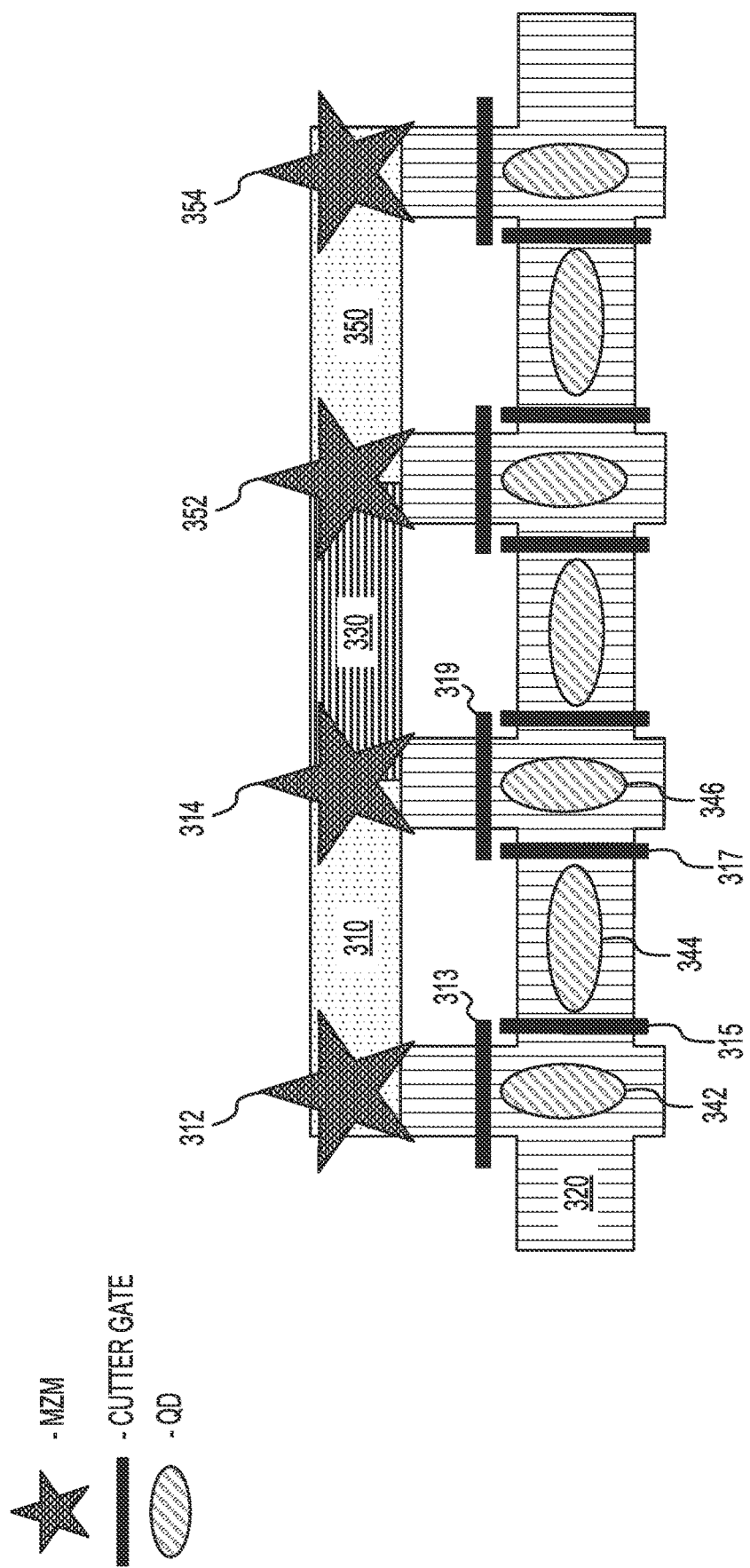
FIG. 3 is a block diagram of a quantum device with chains of quantum dots and cutter gates in accordance with one example.

FIG. 3 is a block diagram of a quantum device 300 with chains of quantum dots and cutter gates in accordance with one example. Quantum device 300 may include topological superconductors (e.g., 310 and 350) that are coupled via a trivial superconductor 330 (e.g., a qubit backbone). The combination of the topological superconductors and the backbone may be referred to as a superconducting island. Each of superconductors 310, 330, and 350 may be formed as nanowires. As an example, superconductors 310, 330, and 350 may be formed as semiconductor wires (e.g., indium arsenide (InAs) wires) coated by a superconductor (e.g., aluminum (Al)). Ends of topological superconductors 310 and 350 may further be coupled via a semiconducting region 320.

With continued reference to FIG. 3, quantum device 300 is operated such that Majorana zero modes (MZMs) 312 and 314 are formed at the ends of topological superconductor 310 and MZMs 352 and 354 are formed at the ends of topological superconductor 350. Cutter gates and quantum dots formed in semiconducting region 320 adjoining the MZMs may allow for the tunable coupling of MZMs to each other or to transport leads. As an example, quantum device 300 may include cutter gates (e.g., cutter gates 313, 315, 317, and 319) arranged as shown in FIG. 3. Cutter gates (e.g., cutter gates 313, 315, 317, and 319) may be supplied a fixed voltage that is sufficiently large to create a small but finite probability of electrons being able to tunnel through a region controlled by a respective cutter gate.

Still referring to FIG. 3, a tunable coupling between MZM 312 and MZM 314 may be controlled through a chain of quantum dots, including quantum dot (QD) 342, QD 344, and QD 346. The quantum dots that are adjacent to the MZMs may have a designated plunger gate that can be used to tune the quantum dot on-resonance or off-resonance with respect to the qubit island. Quantum device 300 may be operated in a manner such that all MZM connections can be configured solely by pulsing the QD plunger gates while leaving all cutter gates at a fixed voltage. Advantageously, the use of chains of quantum dots to control the couplings between MZMs (e.g., MZM 312 and MZM 314) by the detuning of the quantum dots (e.g., QD 342, QD 344, and QD 346) from their resonance point with the qubit island without changing any voltages associated with the cutter gates, reduces the heating compared to that from applying large amplitude voltage pulses to open and pinch-off cutter gates. Although FIG. 3 shows quantum device 300 as including a certain number of components arranged and coupled in a certain way, quantum device 300 may include fewer or additional components arranged and coupled differently.

Figure 4:
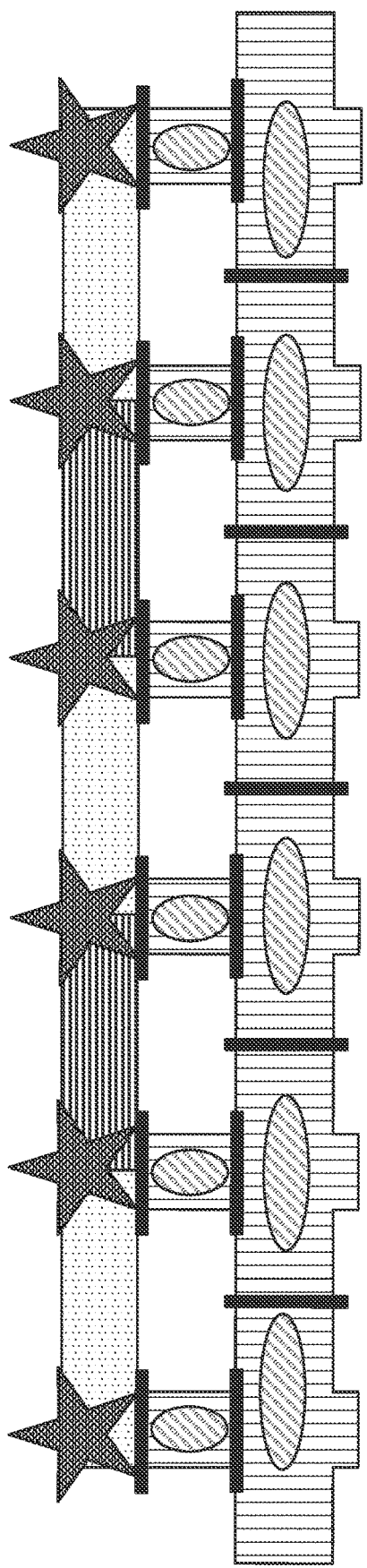
FIGS. 4-6 show additional block diagrams of example quantum devices with chains of quantum dots and cutter gates.
Figure 5:
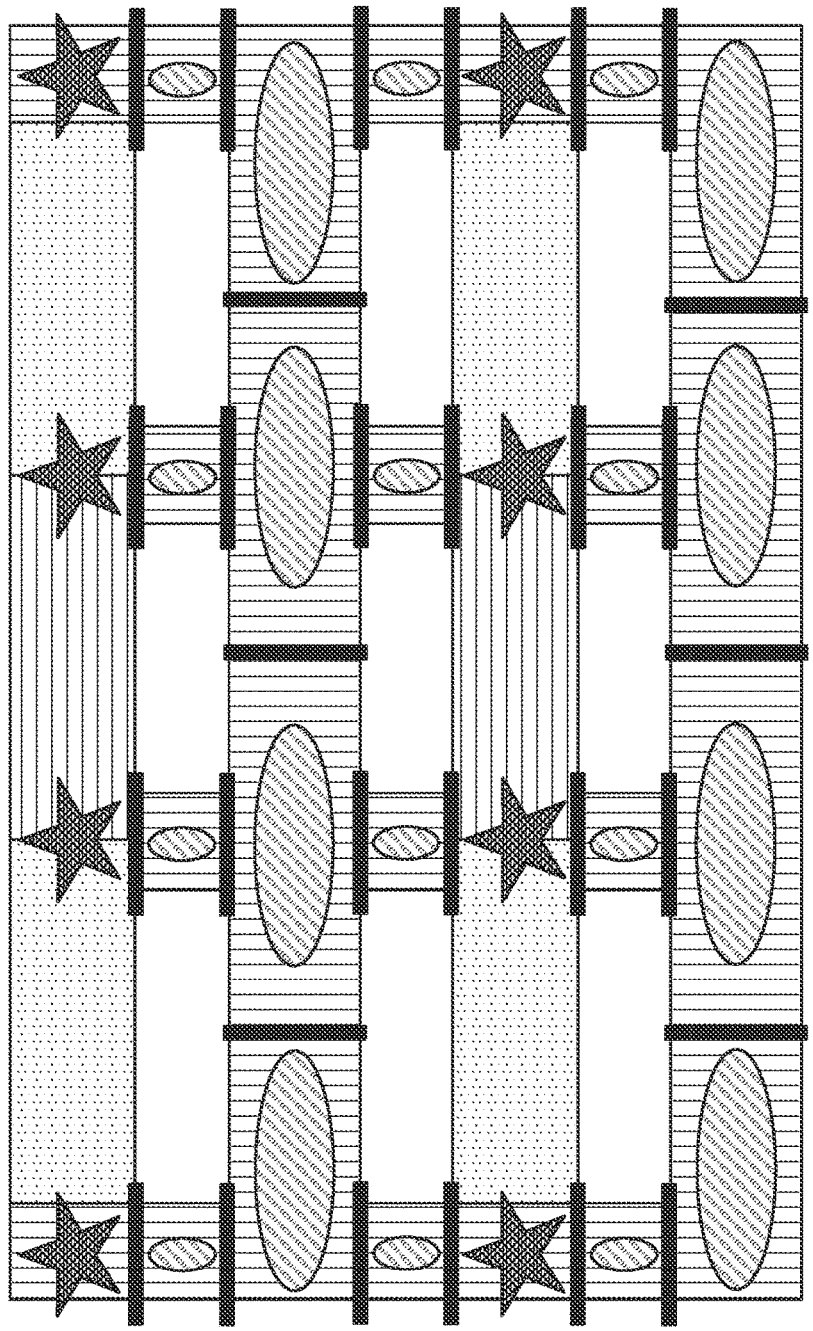
Figure 5:
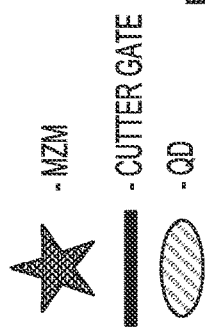
Figure 6:
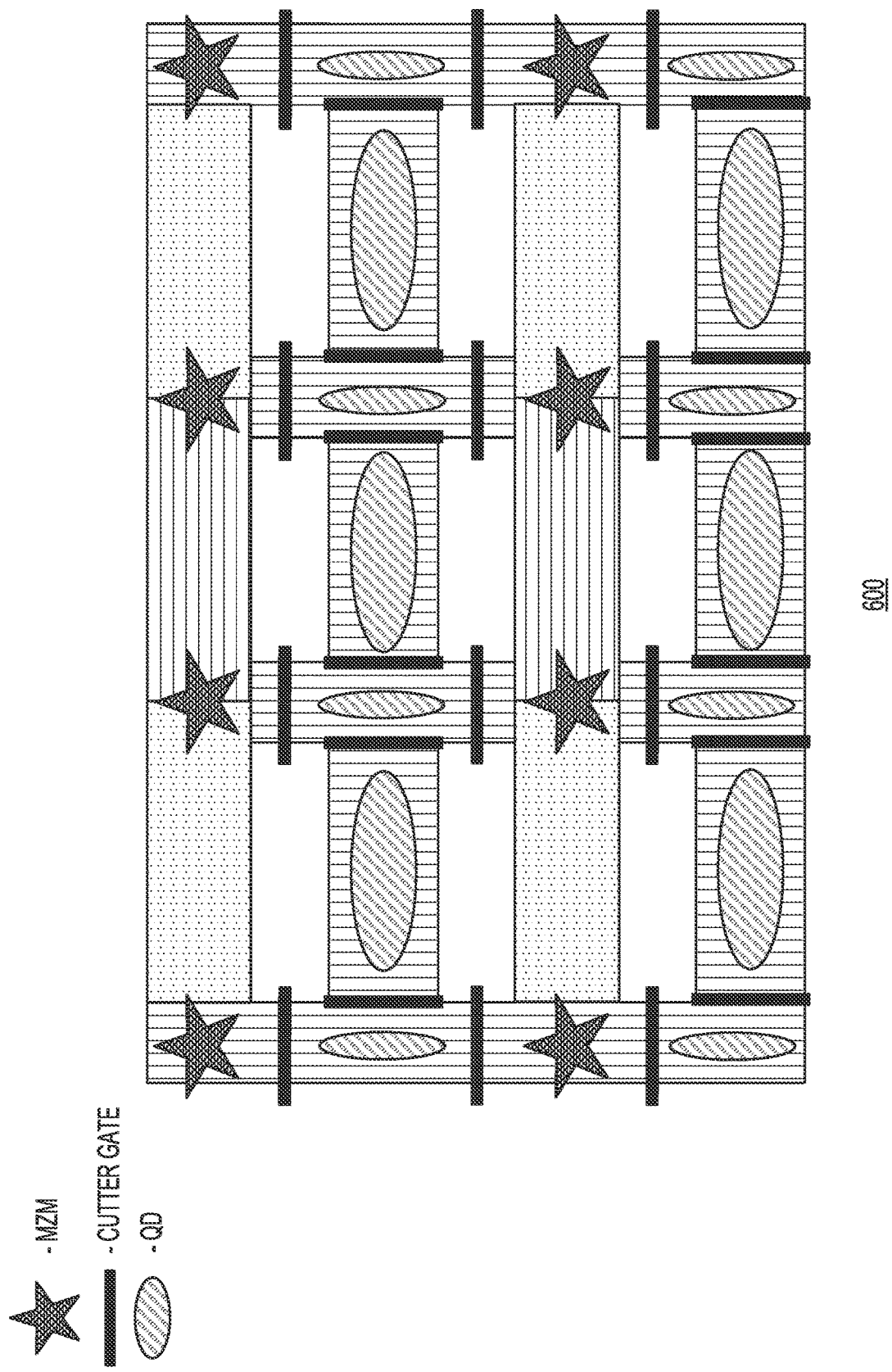

FIGS. 4-6 show additional block diagrams of example quantum devices (e.g., quantum device 400 of FIG. 4, quantum device 500 of FIG. 5, and quantum device 600 of FIG. 6) with chains of quantum dots and cutter gates. Advantageously, as noted previously, the use of chains of quantum dots to control the couplings between MZMs by the detuning of the quantum dots from their resonance point with the qubit island without changing any voltages associated with the cutter gates (as explained earlier with respect to FIGS. 1-3), reduces the heating compared to that from applying large amplitude voltage pulses to open and pinch-off cutter gates. In addition, conventional systems that use only cutter gates to control the couplings between MZMs can be susceptible to disorder in the system. In addition, the chain of quantum dots coupled with cutter gates helps to reduce the effect of disorder in the system by making the tunable couplings more controllable.

Figure 7:
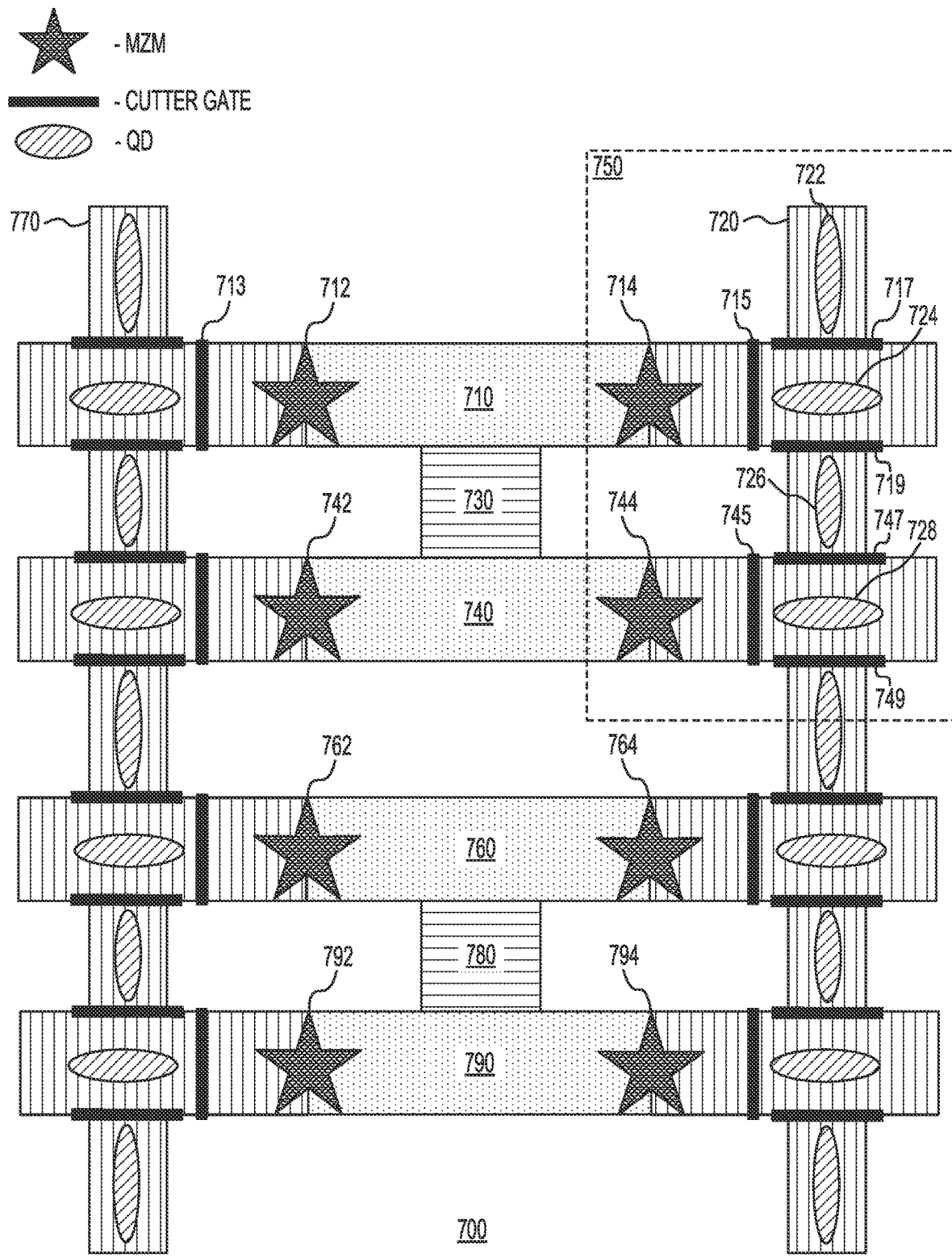
FIG. 7 is a block diagram of another quantum device with chains of quantum dots and cutter gates in accordance with one example.

FIG. 7 is a block diagram of a quantum device 700 with chains of quantum dots and cutter gates in accordance with another example. Quantum device 700 may include topological superconductors (e.g., 710, 740, 760, and 790). Topological superconductors 710 and 740 may be coupled via a trivial superconductor 730 (e.g., a qubit backbone) and topological superconductors 760 and 790 may be coupled via a trivial superconductor 780 (e.g., a qubit backbone). The combination of the topological superconductors 710 and 740 and the backbone (trivial superconductor 730) may be one superconducting island and the combination of the topological superconductors 760 and 790 and the backbone (trivial superconductor 780) may be another superconducting island. Each of superconductors 710, 730, 740, 760, 780, and 790 may be formed as nanowires. As an example, superconductors 710, 730, 740, 760, 780, and 790 may be formed as superconductor wires (e.g., indium arsenide (InAs) wires) coated by a superconductor (e.g., aluminum (Al)). Ends of topological superconductors 710, 740, 760, and 790 may further be coupled via semiconducting regions 720 and 770.

With continued reference to FIG. 7, quantum device 700 is operated such that Majorana zero modes (MZMs) 712 and 714 are formed at the ends of topological superconductor 710, MZMs 742 and 744 are formed at the ends of topological superconductor 740, MZMs 762 and 764 are formed at the ends of topological superconductor 760, and MZMs 792 and 794 are formed at the ends of topological superconductor 790. Cutter gates and quantum dots formed in semiconducting regions (e.g., semiconducting regions 720 and 770) adjoining the MZMs may allow for the tunable coupling of MZMs to each other or to transport leads. As an example, quantum device 700 may include cutter gates (e.g., cutter gates 713, 715, 717, 719, 745, 747, and 749) arranged as shown in FIG. 7. Cutter gates (e.g., cutter gates 713, 715, 717, 719, 745, 747, and 749) may be supplied a fixed voltage that is sufficiently large to create a small but finite probability of electrons being able to tunnel through a region controlled by a respective cutter gate.

Figure 8:
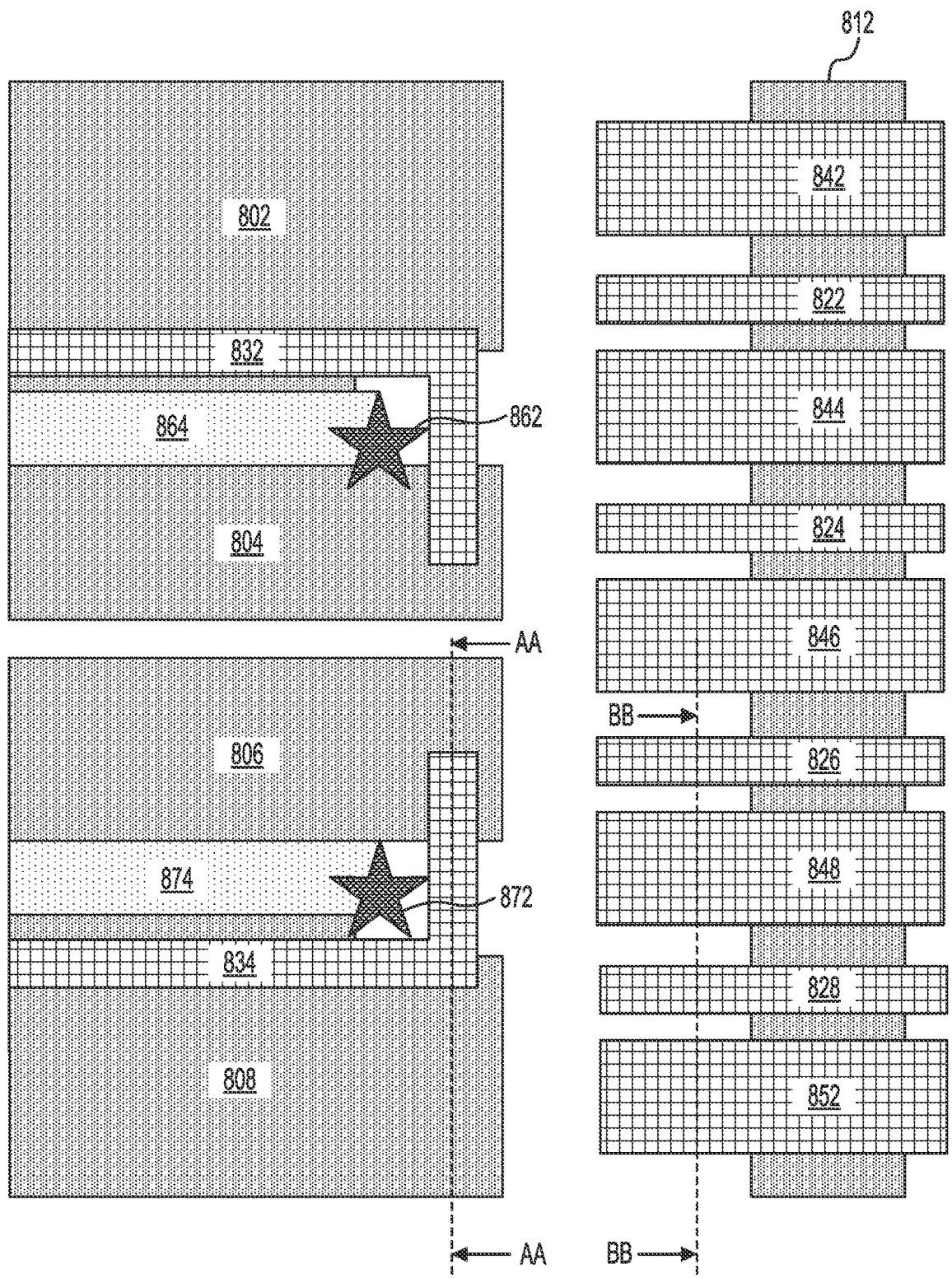
FIG. 8 shows a top view of an example gate configuration associated with a portion of the quantum device of FIG. 7.

Still referring to FIG. 7, a tunable coupling between MZM 714 and MZM 744 may be controlled through a chain of quantum dots, including quantum dot (QD) 724, QD 726, and QD 728. The quantum dots that are adjacent to the MZMs may have a designated plunger gate that can be used to tune the quantum dot on-resonance or off-resonance with respect to the qubit island. Quantum device 700 may be operated in a manner such that all MZM connections can be configured solely by pulsing the QD plunger gates while leaving all cutter gates at a fixed voltage. Advantageously, the use of chains of quantum dots to control the couplings between MZMs (e.g., MZM 714 and MZM 744) by the detuning of the quantum dots (e.g., QD 724, QD 726, and QD 728) from their resonance point with the qubit island without changing any voltages associated with the cutter gates, eliminates the heating associated with the large voltage pulses for pulsing the cutter gates. An example gate configuration corresponding to the area delineated by dotted box 750 is shown in FIG. 8. Although FIG. 7 shows quantum device 700 as including a certain number of components arranged and coupled in a certain way, quantum device 700 may include fewer or additional components arranged and coupled differently.

FIG. 8 shows a top view 800 of an example gate configuration associated with a portion of quantum device 700 of FIG. 7. This example gate configuration relates to a layout for a two-dimensional electronic gas (2DEG) qubit where the superconducting wires are formed in the underlying 2DEG. As part of this example configuration, gates are used to deplete the 2DEG in most of the plane, and to configure quantum dots and tunable junctions in the regions of interest. Although in the example gate configuration shown in FIG. 8, the gates are formed in two layers, the gates may be formed in a single layer. First layer gates, including gates 802, 804, 806, 808, and 812 may be configurable as depletion gates to remove electrons from selected areas of the 2DEG. Second layer gates may include cutter gates (e.g., gates 822, 824, 826, 828, 832, and 834) and plunger gates for controlling the electron density of quantum dots (e.g., gates 842, 844, 846, 848, and 852). In addition, an MZM 862 is shown at one end of a topological superconductor 864 and another MZM 872 is shown at one end of another topological superconductor 874. As explained earlier, cutter gates could be held at a fixed voltage and the plunger gates associated with the quantum dots could be pulsed to control the electron density of the quantum dots (e.g., to control how closely the quantum dots are tuned on/off resonance with respect to the qubit islands). Similar gate configurations may be used with the other quantum devices (e.g., quantum devices 100, 200, 300, 400, 500, and 600 described earlier).

With continued reference to FIG. 8, many variations of this gate configuration are possible. As an example, all gates could be formed in a single layer. The dimensions of the quantum dots could vary so that cutter dots adjacent to the MZMs are small and the quantum dots providing connections between different MZMs are large. The detuning of a quantum dot is related to the off-set gate charge $N_g$ on the dot by the equation $\varepsilon \sim E_c(\hat{N} - N_g)^2$, where $E_c$ is the charging energy and $\hat{N}$ counts the number of electrons on the quantum dot. For a cutter dot (e.g., a quantum dot with a plunger gate) with a pair of cutter gates on either side with tunnel coupling t, in the limit $\varepsilon \gg t$, the total coupling through the quantum dot is given by the equation $$t_{\text{eff}} \sim \frac{t^2}{\varepsilon} = \frac{t^2}{E_C(N - N_g)^2}.$$

Thus, the combination of the quantum dot and the cutter gates forms a tunable coupling that can be controlled by changing the off-set gate charge on the quantum dot, which in turn is controlled by changing the voltage applied to the neighboring electrostatic gates.

Figure 9:
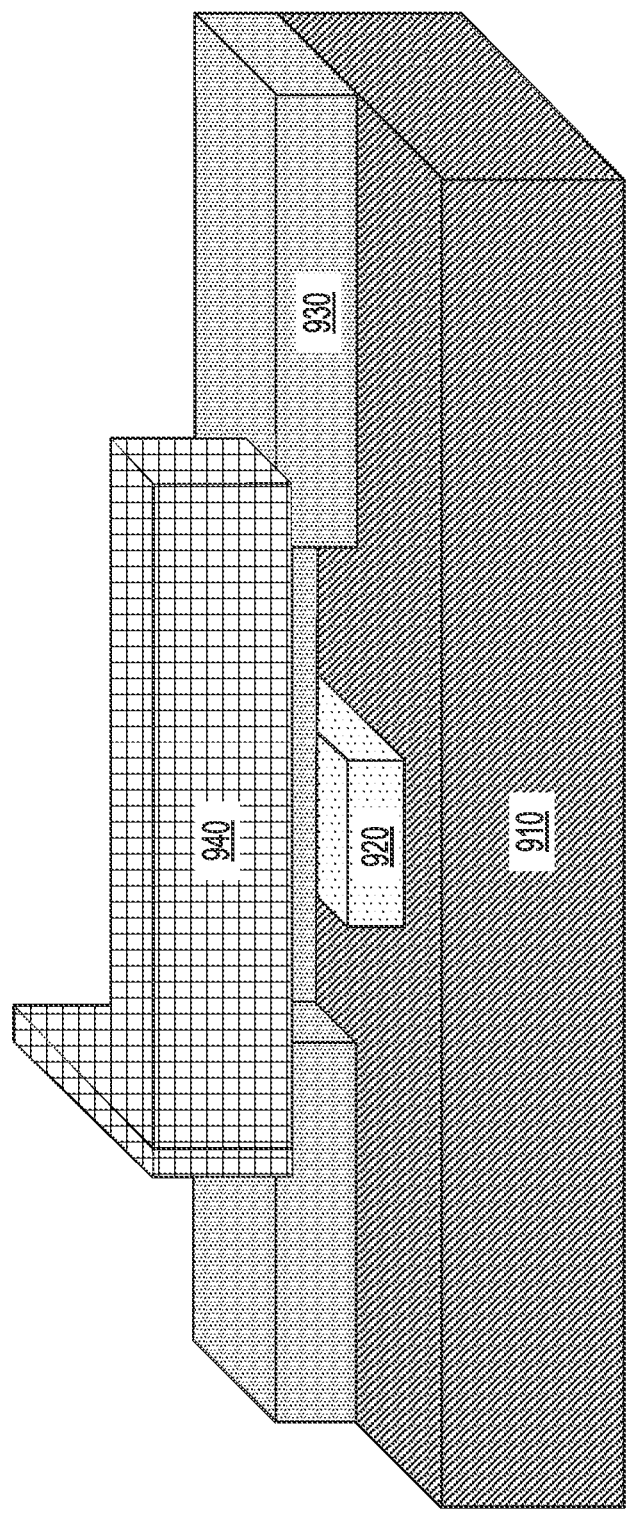
FIG. 9 shows a cross-section view for a portion of the example gate configuration described in FIG. 8.

FIG. 9 shows a cross-section view 900 for a portion of the example gate configuration described in FIG. 8. Cross-section view 900 corresponds to a cross-section along line AA as shown in FIG. 8 (looking right to left) but has been modified to illustrate layers that may not necessarily be visible at the cross-section along line AA. Cross-section view 900 shows a topological superconductor 920 formed on a two-dimensional electron gas (2DEG) 910. In one example, 2DEG 910 may be manufactured by forming a series of layers of semiconductors on a substrate (e.g., using any of indium phosphide (InP), indium arsenide (InAs), indium antimonide (InSb), mercury cadmium telluride (HgCdTe), or any appropriate combination of materials selected from groups II, III, IV, V, or VI of the periodic table, or any ternary compounds of three different atoms of materials selected from groups II, III, IV, V, or VI of the periodic table). As an example, 2DEG 910 may further include a buffer layer (e.g., an indium aluminum arsenide (InAlAs)

layer) formed over the substrate. 2DEG 910 may further include a quantum well layer (e.g., an indium arsenide (InAs) layer) formed over the buffer layer, and another buffer layer formed over the quantum well layer.

Each of these layers may be formed using molecular-beam epitaxy (MBE). As an example, the MBE related process may be performed in an MBE system that allows the deposition of the appropriate materials in a vacuum. Topologically active areas may be defined by depositing a metal layer (e.g., aluminum (Al)) and using electrostatic gates and an applying a magnetic field to tune into the topological phase. 2DEG 910 is shown as a block and the individual layers making up the 2DEG are not illustrated in FIG. 9. In addition, cross-section view 900 shows a first layer gate 930 configurable as a depletion gate to remove electrons from selected areas of 2DEG 910. Finally, cross-section view 900 shows a second layer gate 940 formed over the first layer gate 930. Second layer gate 940 may perform the functions associated with a cutter gate.

Figure 10:
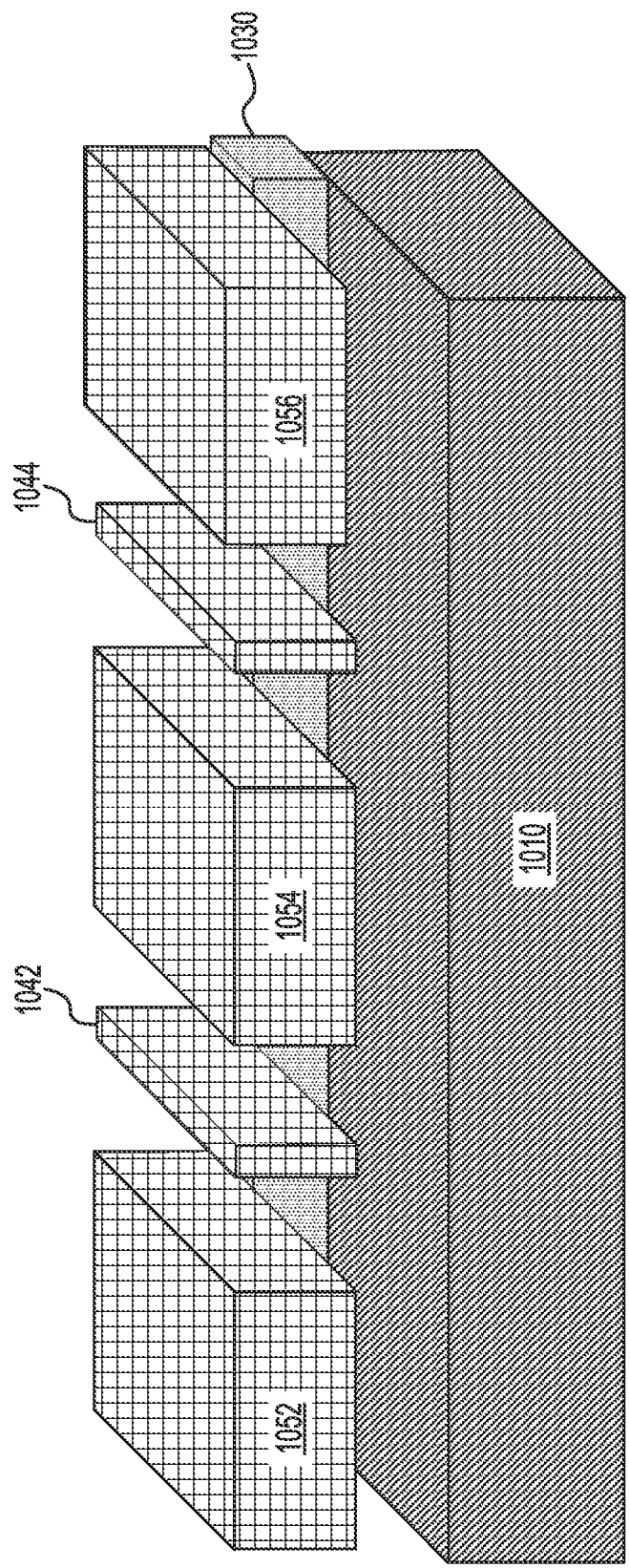
FIG. 10 shows another cross-section view for another portion of the example gate configuration described in FIG. 8.

FIG. 10 shows another cross-section view 1000 for another portion of the example gate configuration described in FIG. 8. Cross-section view 1000 corresponds to a cross-section at a line BB as shown in FIG. 8 (looking left to right) but has been modified to illustrate layers that may not necessarily be visible at the cross-section along line BB. Cross-section view 1000 shows a 2DEG 1010 with a first layer gate 1030 configurable as a depletion gate to remove electrons from selected areas of 2DEG 1010. 2DEG 1010 is shown as a block and the individual layer, described earlier with respect to 2DEG 910 of FIG. 9, making up the 2DEG are not illustrated in FIG. 10. Finally, cross-section view 1000 shows second layer gates 1042, 1044, 1052, 1054, and 1056 formed over the first layer gate 1030. In this view, gates 1042 and 1044 may be configured as cutter gates and gates 1052, 1054, and 1056 may be configured as plunger gates. Although FIGS. 9 and 10 show certain layers arranged in a certain manner, the gate configurations associated with the quantum devices described herein may include additional or fewer layers arranged differently.

The quantum devices described herein may also be advantageous in being able to configure these devices to have Majorana zero modes and to be able to detect the presence of the MZMs by measurement techniques, such as spin-filtering or particle/hole filtering techniques. As an example, the MZMs may be detected by running transport through a quantum device and looking for the presence of zero-bias peaks. This is because when there is a peak in the conductance through the superconductor at no energy difference between the source and the drain, it is one form of evidence of having Majorana zero modes. In addition, the topological phase transition that is accompanying the presence of MZMs can be probed by the bias voltage dependence of the non-local conductance through the device. Since instead of just having a transport lead directly next to the MZM, there is a quantum dot between the transport lead and the MZM, the quantum dot can be configured to only pass current of a specific spin orientation or a specific particle/hole character. This allows for various ways of obtaining additional information from the conductance measurements which can further corroborate evidence of the MZMs. As an example, probing of the spin structure of the zero-bias peak can increase the certainty that what is being observed as the zero-bias peak is the result of the presence of the Majorana zero mode rather than just any other zero energy state. Moreover, spin-resolved measurements can probe the topological phase transition as it is predicted that the spin polarization of the above-gap states switch when transitioning from the trivial superconducting phase to the topological superconducting phase. Particle/hole filtering can improve the visibility of non-local conductance measurements. The non-local conductance is given by the difference of non-local particle and hole transmissions through the device; however, these two transmissions can cancel each other, leading to a reduction of visibility. Measuring the particle and hole components of the conductance separately avoids this cancellation. Such measurements can thus further corroborate the evidence of MZMs. In sum, the quantum devices described herein are built such that every Majorana zero mode has a quantum dot next to it so that one can form a chain of quantum dots. The chain of quantum dots provide additional benefits in configuring the quantum device into the regime where the Majorana zero modes can be easily detected using the spin-filtering techniques or particle/hole filtering techniques via the transport leads.

In conclusion, the present disclosure relates to a quantum device comprising at least one superconducting island configurable to support at least one pair of Majorana zero modes (MZMs). The quantum device may further include a region adjacent to at least one MZM of the at least one pair of MZMs, where the region is configurable to realize a chain of quantum dots for controlling a tunable coupling between the at least one MZM of the at least one pair of MZMs and another MZM.

The chain of quantum dots may comprise at least a first quantum dot and a second quantum dot. A first cutter gate may be formed between the first quantum dot and the at least one MZM of the at least one pair of MZMs and a second cutter gate may be formed between the first quantum dot and the second quantum dot. The first quantum dot may have a corresponding plunger gate configured to tune the first quantum dot on resonance or off resonance with respect to the at least one superconducting island configurable to support the at least one pair of MZMs.

The tunable coupling between the at least one MZM of the at least one pair of MZMs and another MZM can be controlled: (1) by detuning the first quantum dot by applying a voltage pulse to either the first cutter gate or the second cutter gate, (2) by detuning the first quantum dot by applying a voltage pulse to any combination of the first cutter gate, the second cutter gate, and the plunger gate, or (3) by detuning the first quantum dot by applying a voltage pulse to the plunger gate without changing a fixed voltage supplied to either the first cutter gate or the second cutter gate.

Each of the tunable junctions of the quantum device may be formed between MZMs or between an MZM and a quantum dot and each of any other remaining junctions of the quantum device may be a junction between a quantum dot and another quantum dot. The region adjacent to the at least one MZM of the at least one pair of MZMs may comprise a semiconducting region including a transport lead. At least one quantum dot in the chain of quantum dots may be configurable to form a tunable coupling between the transport lead and the at least one MZM of the at least one pair of MZMs to allow for use of spin-filtering or particle/hole filtering.

In another example, the present disclosure relates to a quantum device comprising at least one superconducting island configurable to support at least one pair of Majorana zero modes (MZMs). The quantum device may further include a region adjacent to at least one MZM of the at least one pair of MZMs, where the region is configurable to realize a chain of quantum dots for controlling a tunable coupling between the at least one MZM of the at least one pair of MZMs and another MZM, where the tunable coupling between the at least one MZM of the at least one pair of MZMs and another MZM can be controlled by pulsing a plunger gate associated with one of the chain of quantum dots without changing a fixed voltage supplied to any cutter gates associated with the quantum device. As described later, the tunable coupling between the at least one MZM of the at least one pair of MZMs and another MZM can also be controlled by using other ways to tune a quantum dot in the chain of quantum dots on resonance or off resonance.

Any of a respective plunger gate, a respective cutter gate, or a combination thereof pulsed by an application of the voltage pulse may be configured to tune the at least one quantum dot in the chain of quantum dots on resonance or off resonance with respect to the at least one superconducting island configured to support the at least one pair of MZMs. Each of the tunable junctions of the quantum device may be formed between MZMs or between an MZM and a quantum dot and each of any other remaining junctions of the quantum device may be a junction between a quantum dot and another quantum dot.

The region adjacent to the at least one MZM of the at least one pair of MZMs may comprise a semiconducting region including a transport lead. At least one quantum dot in the chain of quantum dots may be configurable to form a tunable coupling between the transport lead and the at least one MZM of the at least one pair of MZMs to allow for use of spin-filtering or particle/hole filtering.

In yet another example, the present disclosure relates to a method for operating a quantum device comprising at least one superconducting island configurable to support at least one pair of Majorana zero modes (MZMs). The method may include configuring a region adjacent to at least one MZM of the at least one pair of MZMs to realize a chain of quantum dots for controlling a tunable coupling between the at least one MZM of the at least one pair of MZMs and another MZM.

The chain of quantum dots may comprise at least a first quantum dot and a second quantum dot. A first cutter gate may be formed between the first quantum dot and the at least one MZM of the at least one pair of MZMs and a second cutter gate may be formed between the first quantum dot and the second quantum dot. The first quantum dot may have a corresponding plunger gate configured to tune the first quantum dot on resonance or off resonance with respect to the at least one superconducting island configurable to support the at least one pair of MZMs.

The method may further comprise controlling the tunable coupling between the at least one MZM of the at least one pair of MZMs and another MZM by pulsing any combination of one or more gates including at least one of the plunger gate, the first cutter gate, or the second cutter gate to tune the first quantum dot on resonance or off resonance with respect to the at least one superconducting island configurable to support the at least one pair of MZMs.

Each of tunable junctions of the quantum device may be formed between MZMs or between an MZM and a quantum dot and each of any other remaining junctions of the quantum device may be a junction between a quantum dot and another quantum dot. The region adjacent to the one of the at least one pair of MZMs may comprise a semiconducting region including a transport lead, and where at least one quantum dot in the chain of quantum dots is configurable to form a tunable coupling between the transport lead and the at least one MZM of the at least one pair of MZMs to allow for use of spin-filtering or particle/hole filtering It is to be understood that the systems, devices, methods, and components described herein are merely examples. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a device, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:
1. A quantum device comprising:
   at least one superconducting island configurable to support at least one pair of Majorana zero modes (MZMs); and
   a region adjacent to at least one MZM of the at least one pair of MZMs, wherein the region is configurable to realize a chain of quantum dots for controlling a tunable coupling between the at least one MZM of the at least one pair of MZMs and another MZM by detuning at least one quantum dot within the chain of quantum dots to an on-resonance regime or to an off-resonance regime with respect to the at least one superconducting island, wherein the at least one quantum dot has a corresponding plunger gate configured to detune the at least one quantum dot to the on-resonance regime or the off-resonance regime with respect to the at least one superconducting island.

2. The quantum device of claim 1, wherein the tunable coupling between the at least one MZM of the at least one pair of MZMs and another MZM can be controlled: (1) by detuning the first at least one quantum dot by applying a voltage pulse to either the first cutter gate or the second cutter gate, (2) by detuning the first at least one quantum dot by applying a voltage pulse to any combination of the first cutter gate, the second cutter gate, and the plunger gate, or (3) by detuning the at least one quantum dot by applying a voltage pulse to the plunger gate without changing a fixed voltage supplied to either the first cutter gate or the second cutter gate.

3. The quantum device of claim 1, wherein each of tunable junctions of the quantum device is formed between MZMs or between an MZM and a quantum dot and each of any other remaining junctions of the quantum device is a junction between a quantum dot and another quantum dot.

4. The quantum device of claim 1, wherein the region adjacent to the at least one MZM of the at least one pair of MZMs comprises a semiconducting region including a transport lead.

5. The quantum device of claim 4, wherein one or more quantum dots in the chain of quantum dots is configurable to form another tunable coupling between the transport lead and the at least one MZM of the at least one pair of MZMs to allow for use of spin-filtering or particle/hole filtering.

6. The quantum device of claim 1, wherein the superconducting island comprises a combination of topological superconductors and a backbone comprising a trivial superconductor.

7. The quantum device of claim 6, wherein each of the topological superconductors and the trivial superconductor comprises nanowires formed within a two-dimensional electronic gas (2DEG) qubit where the superconducting island is formed in the underlying 2DEG, and wherein the quantum device further comprises a plurality of depletion gates configured to deplete electrons from within the 2DEG.

8. A quantum device comprising:
at least one superconducting island configurable to support at least one pair of Majorana zero modes (MZMs); and
a region adjacent to at least one MZM of the at least one pair of MZMs, wherein the region is configurable to realize a chain of quantum dots for controlling a tunable coupling between the at least one MZM of the at least one pair of MZMs and another MZM by detuning at least one quantum dot within the chain of quantum dots to an on-resonance regime or to an off-resonance regime with respect to the at least one superconducting island, wherein the tunable coupling between the at least one MZM of the at least one pair of MZMs and another MZM can be controlled by detuning the at least one quantum dot in the chain of quantum dots by applying a voltage pulse to: (1) at least one plunger gate associated with the at least one quantum dot, (2) at least one cutter gate associated with the at least one quantum dot, or (3) a combination of at least one plunger gate associated with the at least one quantum dot and at least one cutter gate associated with the at least one quantum dot.

9. The quantum device of claim 8, wherein any of a respective plunger gate, a respective cutter gate, or a combination thereof pulsed by an application of the voltage pulse is configured to detune the at least one quantum dot in the chain of quantum dots on resonance or off resonance with respect to the at least one superconducting island configured to support the at least one pair of MZMs.

10. The quantum device of claim 8, wherein each of tunable junctions of the quantum device is formed between MZMs or between an MZM and a quantum dot and each of any other remaining junctions of the quantum device is a junction between a quantum dot and another quantum dot.

11. The quantum device of claim 8, wherein the region adjacent to the at least one MZM of the at least one pair of MZMs comprises a semiconducting region including a transport lead.

12. The quantum device of claim 11, wherein the at least one quantum dot in the chain of quantum dots is configurable to form another tunable coupling between the transport lead and the at least one MZM of the at least one pair of MZMs to allow for use of spin-filtering or particle/hole filtering.

13. The quantum device of claim 8, wherein the at least one superconducting island comprises a combination of topological superconductors and a backbone comprising a trivial superconductor.

14. The quantum device of claim 13, wherein each of the topological superconductors and the trivial superconductor comprises nanowires formed within a two-dimensional electronic gas (2DEG) qubit where the superconducting island is formed in the underlying 2DEG, and wherein the quantum device further comprises a plurality of depletion gates, formed in a first layer of the quantum device, configured to deplete electrons from within the 2DEG.

15. The quantum device of claim 14, wherein each of the at least one plunger gate and the at least one cutter gate is formed in a second layer, different from the first layer, of the quantum device.

16. A method for operating a quantum device comprising at least one superconducting island configurable to support at least one pair of Majorana zero modes (MZMs), wherein the quantum device further comprises a plurality of plunger gates and a plurality of cutter gates, the method comprising:
configuring a region adjacent to at least one MZM of the at least one pair of MZMs to realize a chain of quantum dots; and
by applying voltages pulses to one or more of the plurality of plunger gates, without changing a fixed voltage being supplied to any of the plurality of cutter gates, controlling a tunable coupling between the at least one MZM of the at least one pair of MZMs and another MZM by detuning at least one quantum dot within the chain of quantum dots to an on-resonance regime or to an off-resonance regime with respect to the at least one superconducting island.

17. The method of claim 16, wherein a first cutter gate, from among the plurality of cutter gates, is formed between the first quantum dot and the at least one MZM of the at least one pair of MZMs and a second cutter gate, from among the plurality of cutter gates, is formed between the first quantum dot and the second quantum dot.

18. The method of claim 17, wherein the first quantum dot has a corresponding plunger gate, from among the plurality of cutter gates, configured to detune the first quantum dot on resonance or off resonance with respect to the at least one superconducting island configurable to support the at least one pair of MZMs.

19. The method of claim 16, wherein each of tunable junctions of the quantum device is formed between MZMs or between an MZM and a quantum dot and each of any other remaining junctions of the quantum device is a junction between a quantum dot and another quantum dot.

20. The method of claim 16, wherein the region adjacent to the one of the at least one pair of MZMs comprises a semiconducting region including a transport lead, and wherein the at least one quantum dot in the chain of quantum dots is configurable to form the tunable coupling between the transport lead and the at least one MZM of the at least one pair of MZMs to allow for use of spin-filtering or particle/hole filtering.

* * * * *